United States Patent [19]

Overbury et al.

[11] 3,946,386

[45] Mar. 23, 1976

[54] NAVIGATION RECEIVER WITH DOPPLER FILTER GATING

[75] Inventors: Francis G. Overbury, Cuffley; Paul Barton, Bishop Stortford, both of England

[73] Assignee: International Standard Electric Corporation, New York, N.Y.

[22] Filed: Nov. 18, 1974

[21] Appl. No.: 524,554

[30] Foreign Application Priority Data
Nov. 27, 1973  United Kingdom............... 54970/73

[52] U.S. Cl....................... 343/106 D; 343/113 DE
[51] Int. Cl.²............................................ G01S 1/44
[58] Field of Search...... 343/106 D, 108 M, 113 DE

[56] References Cited
UNITED STATES PATENTS 3,670,337   6/1972   Earp et al. ...................... 343/106 D
3,774,212   11/1973  Eckert et al. .................... 343/106 D Primary Examiner—Maynard R. Wilbur
Assistant Examiner—T. M. Blum
Attorney, Agent, or Firm—William T. O'Neil

[57] ABSTRACT

A navigation guidance receiving system for use with a Doppler navigation beacon of the type comprising a commutated linear array for producing a simulated Doppler effect. The receiving system includes a wideband Doppler beat waveform information filter and measurement circuits. Means are also provided to gate the filter output synchronously to allow dissipation of the filter transient response. The result is reduced filter frequency "pulling" and reduced measurement error due to the effect of multipath signals having beat frequencies in the filter rejection band.

10 Claims, 11 Drawing Figures

NAVIGATION RECEIVER WITH DOPPLER FILTER GATING

BACKGROUND OF THE INVENTION

1. Field of the Invention

The invention relates generally to navigation guidance systems, and more particularly, to such systems employing equipment for air derivation of guidance data from signals received from the commutated array of a Doppler simulating ground beacon system.

2. Description of the Prior Art

The invention relates to a radio navigation receiver for use in a known type of Doppler radio navigation system wherein there is a ground beacon transmission format involving commutation of a first radio frequency in turn to a linear array of radiators (typically on the order of 60λ in electrical length) so as to simulate constant velocity unidirectional or bidirectional scanning of the array. In such systems, a main bearing signal is transmitted which, as "seen" by a receiver of the system, undergoes a Doppler frequency shift proportional to the sine of the angle subtended by the receiver normal to the axis of the array. The transmission format also includes simultaneous transmission of a reference signal of a second radio frequency (offset from the first), whereby the receiver is able to utilize this and the main signal to derive a Doppler beat waveform having a frequency indicative of the said angle.

A form of beacon having the above defined transmission format, with unidirectional scanning, is described in our British Pat. No. 1,225,190, and a form of beacon having the above defined transmission format with bidirectional scanning is described in British Pat. No. 1,234,541.

A feature of the above described transmission format is that, in an elevation guidance system wherein the commutated array is vertical, the direct path signal as received by a radio receiver of the system may in principle be readily distinguished from a multipath signal, i.e., a signal which has been reflected from the ground (a multipath signal), for example, because the Doppler frequency shift imparted to the direct path signal is in the opposite direction to that imparted to the ground reflected signal. Accordingly, the receiver fundamentally needs to include a wideband Doppler information filter having a passband covering the range of Doppler beat frequencies corresponding to the direct path signal, but having a rejection band covering such frequencies corresponding to multipath signals.

Typical beat frequencies for a Doppler elevation system are (for direct path signals) 14.88 KHz at 0° elevation down to 8.22 KHz at 10° elevation. The ground multipath signal may be typically between 14.88 KHz (0°) and 21.54 KHz (−10°). The information filter therefore would have a passband of approximately 8.2 to 14.8 KHz.

It is known, however, that the frequency side-lobes of the reflected signals spread more or less uniformly across the passband of the filter, producing significant bearing indication error for flight paths over the whole sector. A zero-crossing detector and counter are used to register the total number of counts occurring over a complete digitization period for actual data extraction. That instrumentation is known and is described in British Pat. No. 1,234,541.

The concept of digitization relates to incrementing of the radio frequency phase of the energy fed to the ground beacon commutated array over a "data slot" (i.e., scans utilized in obtaining a single data point). The concept is described in more detail in U.S. Pat. application Ser. No. 480,006 filed June 17, 1974, entitled "Doppler Microwave Landing System Signal Simulator".

A further error occurs, due to frequency pulling of the beat signal toward the center frequency of the filter. This characteristic is well known and is referred to as filter truncation. These two effects are essentially independent of one another, and combine linearly in respect to the errors they generate. The manner in which the present invention deals with these prior art problems will be understood as this description proceeds.

SUMMARY OF THE INVENTION

According to the invention there is provided a remote (airborne for example) radio navigation receiver for use in a Doppler radio navigation system of the type hereinbefore referred to, having a transmission format with digitized scanning, said receiver including first means for deriving a Doppler beat information signal from the signals received from the ground beacon. The receiver includes a wideband Doppler information signal filter having a passband covering the range of Doppler beat frequencies of the direct path signal, means for generating a signal representative of the time at which each array scan cycle is initiated, means synthronized by said scan cycle initiation for determining the frequency of said Doppler signal during each said scan cycle, and means also under control of said scan initiation representing signal for inhibiting operation of the Doppler frequency measurement during at least part of the transient response time of the filter.

BRIEF DESCRIPTION OF THE DRAWINGS

The invention will be better understood from the following detailed elucidation in conjunction with accompanying drawings, briefly described as follows.

DESCRIPTION OF THE PREFERRED EMBODIMENT

Figure 1:
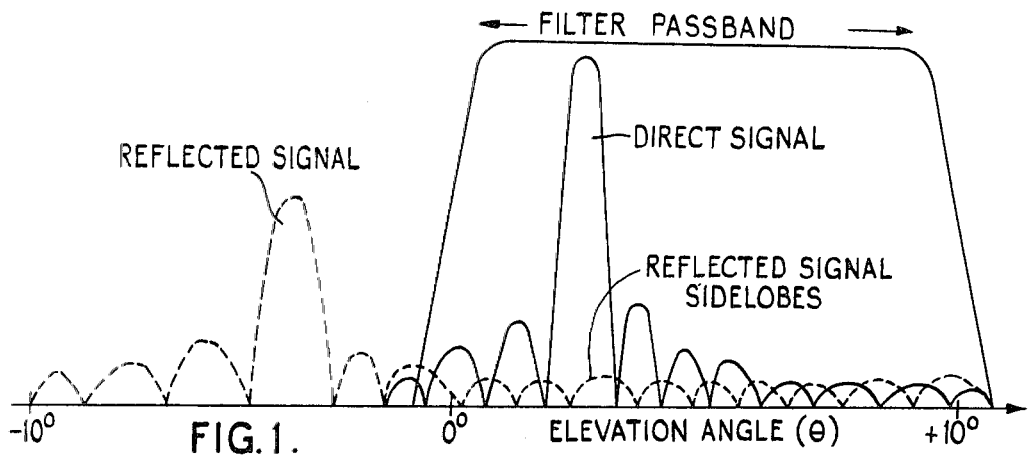
FIG. 1 shows received signals both inside and outside the passband of a Doppler information signal wideband filter.

Before beginning the description of the structure, it will be helpful to examine and understand FIG. 1. It will be noted that frequency side lobes are not eliminated by bandpass filtering per se, since they traverse the passband relatively uniformly.

Figure 2:
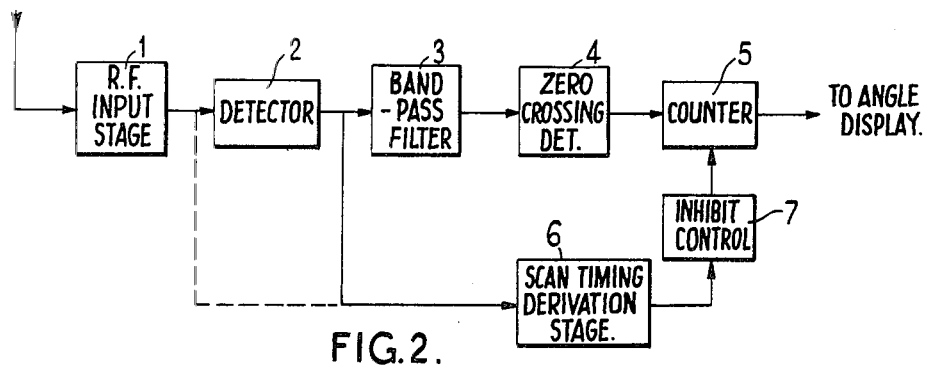
FIG. 2 is a schematic block circuit diagram of a radio navigation receiver embodying the invention.

Referring now to FIG. 2, the receiver shown comprises an R.F. input state 1, whereat signals received in accordance with the defined transmission format from an associated ground beacon are subjected to the necessary frequency conversion and amplification to be passed to detector stage 2, the output of which is the Doppler beat waveform.

After the detector 2 there is a bandpass filter 3 covering the expected range of useful Doppler beat frequencies. Here the direct path signal is passed and multipath signals are rejected or at least attenuated. The next two stages 4 and 5 comprise a zero crossing detector 4 and a counter 5 to produce an output which is fed to any suitable read out, e.g., a center zero D.C. meter or other form of angle (elevation in the instance being described) information display.

In order to derive the bearing information within stages 4 and 5, it is necessary to control the time over which the period of the filtered signal is measured by the zero crossing detector 4 and the counter 5, this period being determined by the scan period.

The remaining stages in FIG. 2 include a scan timing derivation stage 6 having as its input either the Doppler beat waveform from the detector 2 or (alternatively) the output from the R.F. stage 1. From either of these signals the instant of commencement of each scan may be determined, and a control stage 7 arranged to inhibit operation of the bearing signal count, i.e., to gate the signal in synchronism with the scan rate.

At this stage of description, it is pointed out that, alternatively, the scan phase information can be transmitted on a sub-carrier from the reference antenna of the ground beacon. Also, as an alternative to the zero crossing detector 4, there may be employed a computing period counter wherein clock pulses are counted for the same proportion of the period of the Doppler beat signal waveform.

The nature and effects of the Doppler beat signal input to the wideband filter 3 have already been indicated to some extent earlier in this specification.

Figure 3:
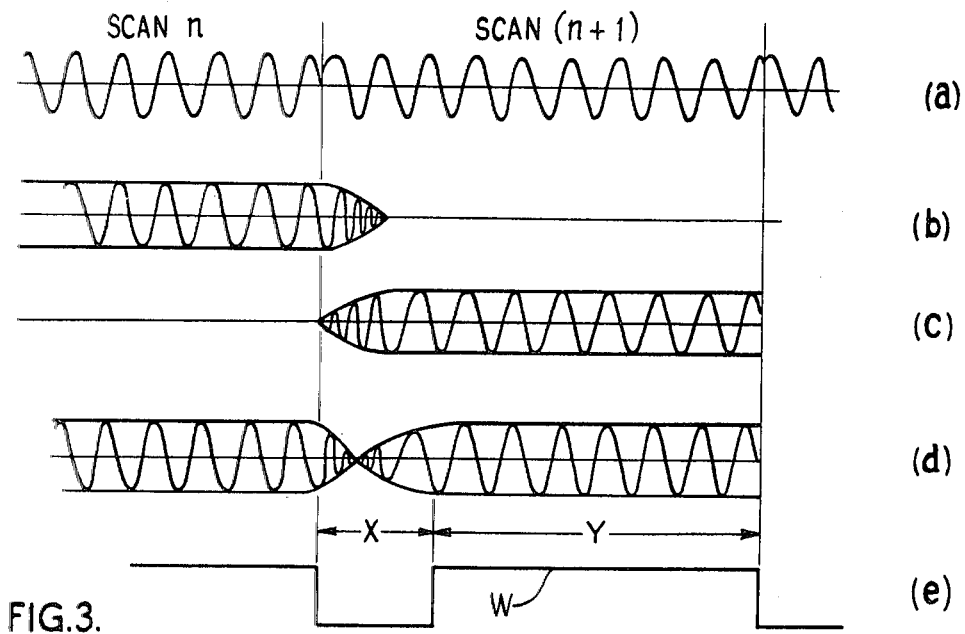
FIG. 3 shows response characteristics of the information filter.

The transient response of the filter to a signal will vary throughout the digitization cycle because of the differening phase transient at the scan ends. The transient is most noticeable when the waveform undergoes a phase transient of 180°. This situation is illustrated in FIG. 3, with waveform a illustrating the end of scan n of the input beat signal followed by scan ($n+1$), with an assumed 180° phase shift at the scan "interface". Waveform b of FIG. 3 shows the filter response to scan n only, waveform c the filter response to scan ($n+1$) only, with waveform d illustrating the composite response. In the region X, the filter output is ringing near the filter center frequency, whereas in the region Y the filter output frequency approaches that of the input signal. Accordingly, the period of the signal is measured outside the transient time. A gating signal W (waveform e) synchronized to the scan rate accomplishes this, so that the described truncation effect is substantially reduced. Signal W is applied by 7 to inhibit 5, see FIG. 2. Scan gating thus inhibits signal measurement during the transient period when the filter output frequency is not correctly established at the signal frequency, and thus reduces the frequency pulling effect of the filter. This timing and gating arrangement may be referred to generally as synchronizing means.

Figure 4:
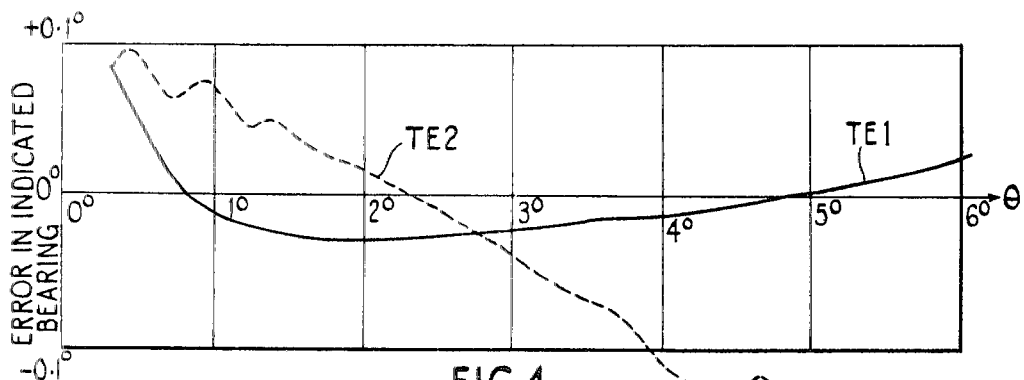
FIG. 4 illustrates bearing errors due to filter truncation.

Referring now to FIG. 4, the solid line curve TEL represents the magnitude of the truncation effect for the filter where a computing period counter is enabled for 75% of the scan time, not including the transient response region of the filter. For comparison, the dashed line curve TE2 depicts the magnitude of the truncation effect without scan gating, i.e., permitting beat frequency counting in 5 of FIG. 2 over the whole scan period.

Scan gated timing will be seen also to reduce the effect of (ground) multipath signals, by effecting suppression of multipath signals in the filter rejection band.

FIG. 5a shows a multipath beat signal $f_{mp}$, over the scan period $T_{scan}$, applied to the input of the wideband filter. After some delay, an initial high amplitude response occurs which subsequently decays to a level approaching the steady state rejection of the filter, see FIG. 5b. The response of the same filter to a signal $f_s$ at FIG. 5c inside the passband is also shown, illustrating the buildup of output signal toward a steady state, FIG. 5d. By limiting frequency measurement to a near-steady state region, by the gating waveform W synchronized to the scan rate, the effect of the multipath signal is substantially reduced.

Figure 5:
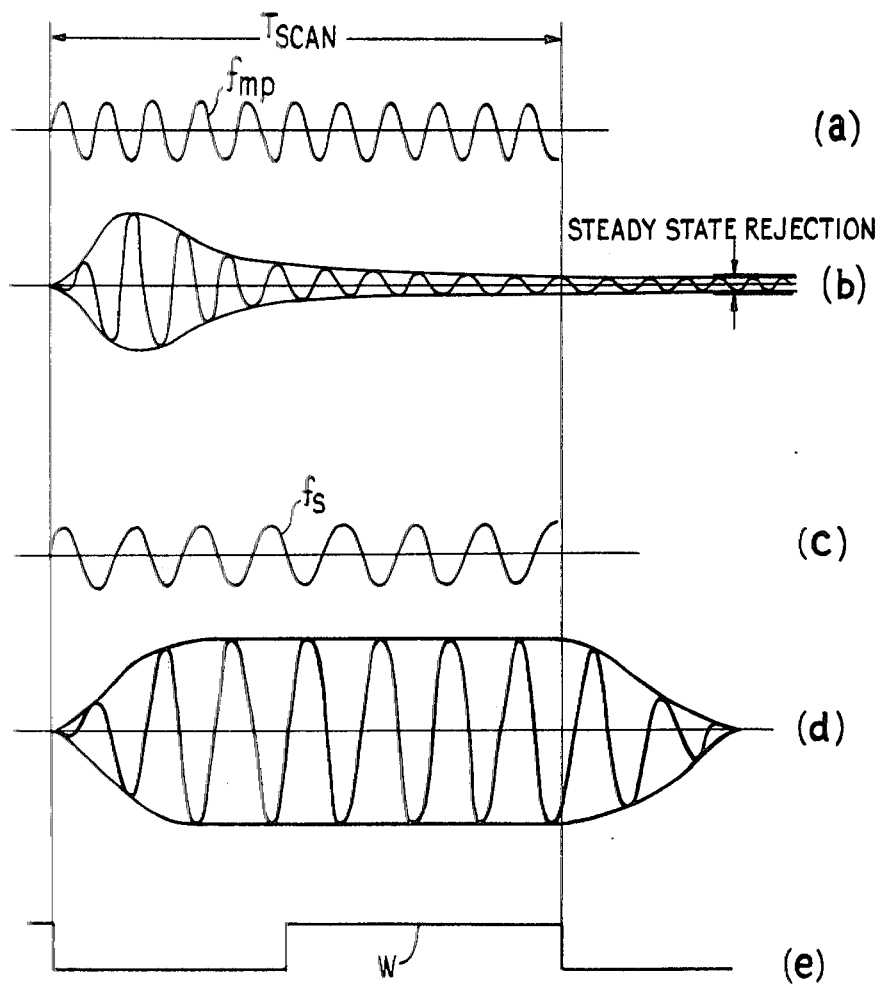
FIG. 5 shows further response characteristics of the information filter.
Figure 6:
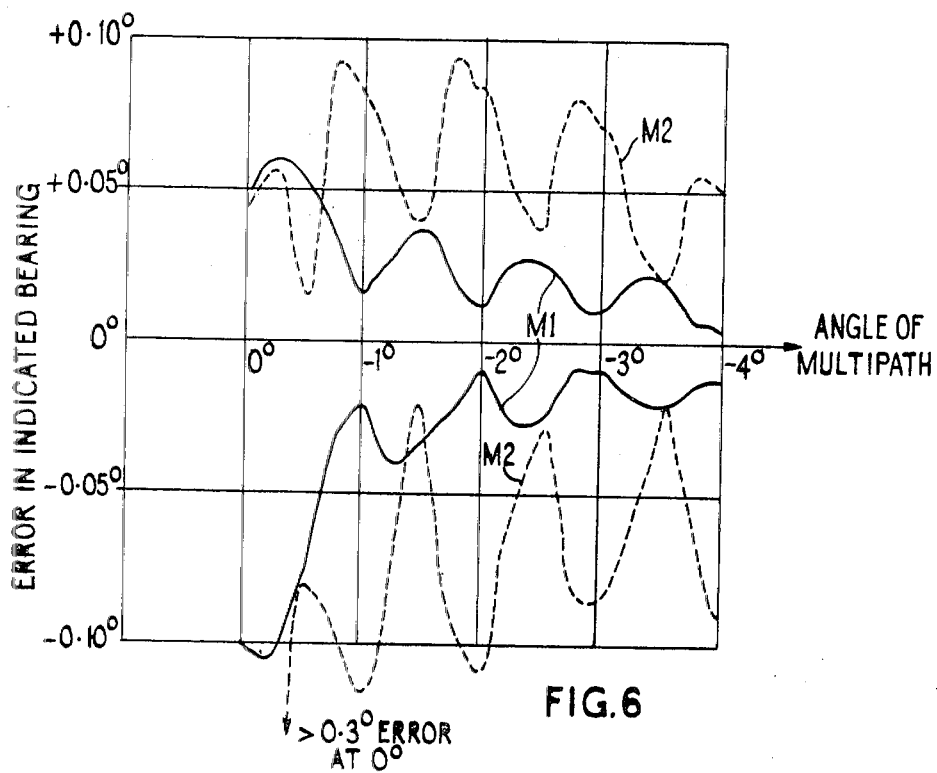
FIG. 6 illustrates bearing errors due to multipath signals.

The solid line curves M1 in FIG. 6 show peak error in indicated bearing (for worst phase multipath case) with the wideband information filter of FIG. 5 where a computing period counter is enabled for 75% of the scan time. The multipath signal is 3dB down on the direct signal for a flight path of 3° in elevation, with the multipath signal assumed to be coherent and at a negative angle between 0° and −4°. For comparison, the dashed line curves M2 of FIG. 6 show multipath errors under identical conditions but with full scan time counting.

Figure 7:
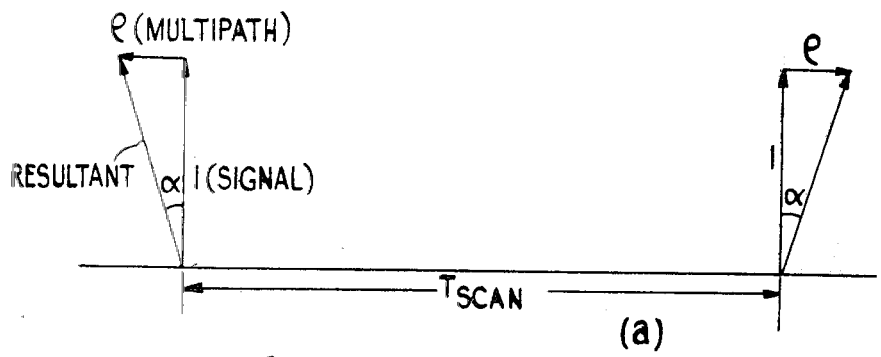
FIG. 7 depicts the effect of in-band multipath signals.
Figure 7:
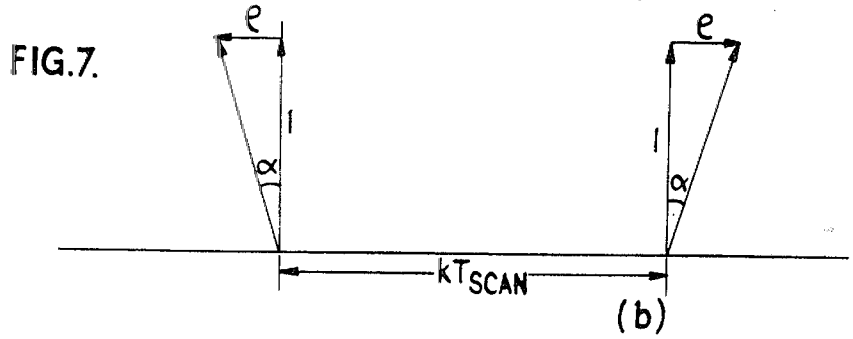

Scan gating offers no advantage in respect to in-band reflected signals. In fact, the errors produced in indicated bearing are larger, approximately by a factor $1/k$, where $k$ is the proportion of the scan for which the period counter is enabled. This can be explained as follows, with reference to FIG. 7.

FIG. 7a shows the relative phasing of direct signal and multipath vectors giving a maximum error in measured frequency will full scan measurement:

$$\alpha = \simeq \rho \text{ radians.}$$

Fractional error in cycles over scan time $\simeq \alpha/\pi$ Therefore, error in measured frequency $\simeq \alpha/\pi \, T_{scan}$.

FIG. 7b shows the vector disposition giving maximum error for measurement over a fraction k of the scan length. For this case, the error in measured frequency $$\simeq \left(\frac{1}{k}\right)\left(\frac{\alpha}{\pi} T_{scan}\right).$$

Figure 8:
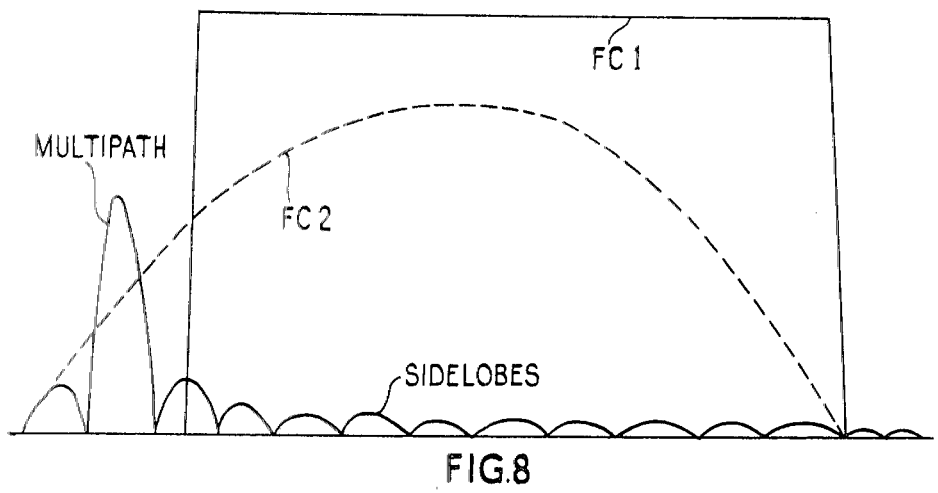
FIG. 8 illustrates filter passband characteristics.
Figure 9:
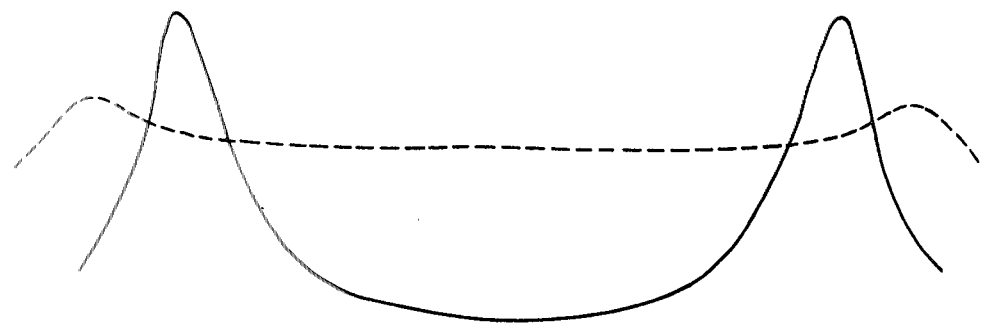
FIG. 9 depicts filter group delay characteristics.
Figure 10:
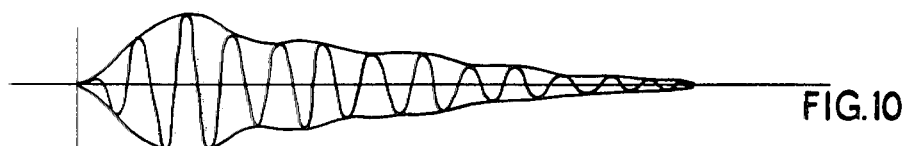
FIGS. 10 and 11 display filter response characteristics.

The optimum choice of filter characteristic shape is determined by particular requirements of a given system, and will occur between the two extremes shown in FIG. 8. Characteristic FC1 shows a filter shape with an extremely flat passband and with extremely steep skirts. The group delay of such a filter, as shown by the solid line in FIG. 9, will vary somewhat over the passband, and will vary rapidly near the band edge. This implies an extended transient response (in time) to a multipath beat signal in the rejection band, finally decaying to a very small steady state amplitude, see FIG. 10. The steady state is not however achieved before the scan is terminated, so that the effect of multipath is not substantially reduced by the time the scan gating pulse is enabled, although the scan gating technique does offer some improvement over full-scan timing.

Figure 11:
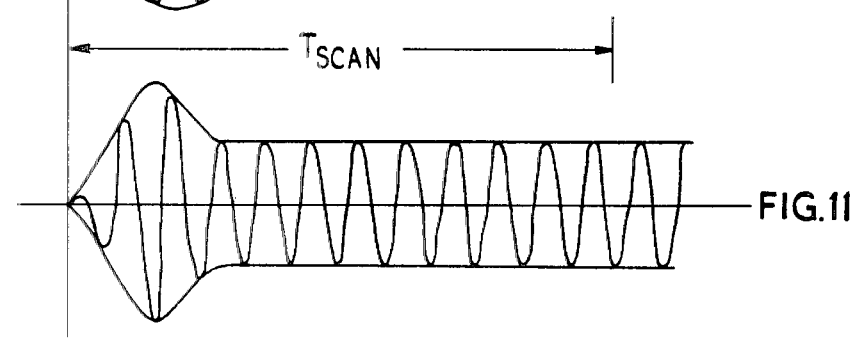

Now consider a filter with non-flat passband and rather gradual skirts FC2 of FIG. 8. Such a shape is compatible with a near constant group delay characteristic, as shown in dashed line in FIG. 9, and this yields a short transient response time, see FIG. 11. The steady state rejection however, is not fully adequate and once again the multipath suppression will not be maximized.

The best filter shape is clearly between these two extremes, where a moderate group delay distortion is allowed, so that moderately good steady state rejection can be achieved as well as reasonably confined transient response.

It is to be understood that the foregoing description of a specific embodiment with design criteria is made by way of example only and is not to be considered as a limitation on the scope of the invention.

For purposes of this description, the time of a scan cycle is taken to mean the time beginning with the commutation of the first element of the ground array through the last element to be commutated in a given directional sense.

What is claimed is:

1. In a Doppler type radio navigation receiving system arranged to be responsive to a radio beacon transmitting a main angle data signal produced through successively scanning by commutating a radio frequency source to the radiating elements of a linear array according to a predetermined switching directional program and a transmitted reference signal at a frequency offset from the frequency of said radio frequency source, said beacon being arranged to digitize the scan program of said array, the combination comprising:
   first means within said receiving system for deriving a Doppler beat information signal from said main and reference beacon signals;
   a bandpass filter connected to receive said beat signal from said first means, said filter pass band substantially covering the frequency range of said information signal corresponding to said main angle data signals arriving at said receiver by direct path;
   frequency measurement means responsive to the output of said bandpass filter for determining the frequency of said beat signal;
   synchronizing means responsive to at least one of said main and reference signals, generating a gating period for controlling the time of response of said frequency measurement means to produce an output therefrom for a time during each of said scan cycles which is less than the period of the full corresponding scan cycle.

2. A system according to claim 1 in which said gating period is further defined with respect to the time of commencement of each of said scan cycles by a predetermined amount so as to inhibit operation of said frequency measurement means during at least a portion of the time of transient response of said bandpass filter.

3. A system according to claim 2 in which said delay of said gating period is approximately 25 percent of the time of each of said scan cycles.

4. A system according to claim 1 in which gating period is defined as not exceeding 75 percent of the time of each of said scan cycles.

5. Apparatus according to claim 1 in which said frequency measurement means comprises a zero crossing detector and a counter responsive thereto, the output of said counter being an analog signal responsive to the count reached in said counter during a predetermined number of said scan cycles.

6. Apparatus according to claim 2 in which said bandpass filter has a response characteristic selected between the extremes of flat passband with steep skirts on the one hand, and non-flat passband with gradual skirts on the other hand having a near constant group delay characteristic, such that an optimum compromise between steady state rejection and group delay distortion is achieved.

7. Apparatus according to claim 3 in which said bandpass filter had a response characteristic selected between the extremes of flat passband with steep skirts on the one hand, and non-flat passband with gradual skirts on the other hand having a near constant group delay characteristic, such that an optimum compromise between steady state rejection and group delay distortion is achieved.

8. Apparatus according to claim 4 in which said bandpass filter has a response characteristic selected between the extremes of flat passband with steep skirts on the one hand, and non-flat passband with gradual skirts on the other hand having a near constant group delay characteristic, such that an optimum compromise between steady state rejection and group delay distortion is achieved.

9. Apparatus according to claim 5 in which said bandpass filter has a response characteristic selected between the extremes of flat passband with steep skirts on the one hand, and non-flat passband with gradual skirts on the other hand having a near constant group delay characteristic, such that an optimum compromise between steady state rejection and group delay distortion is achieved.

10. A system according to claim 1 in which said synchronizing means is defined as being responsive to said main signal received from said radio beacon.

* * * * *